United States Patent [19]
Kuehl

[11] Patent Number: 4,786,487
[45] Date of Patent: Nov. 22, 1988

[54] PREPARATION OF CRYSTALLINE SILICOALUMINOPHOSPHATES

[75] Inventor: Guenter H. Kuehl, Cherry Hill, N.J.

[73] Assignee: Mobil Oil Corporation, New York, N.Y.

[21] Appl. No.: 151,737

[22] Filed: Feb. 3, 1988

Related U.S. Application Data

[63] Continuation-in-part of Ser. No. 816,090, Jan. 3, 1986, abandoned.

[51] Int. Cl.$^4$ .................. C01B 33/28; B01J 27/14
[52] U.S. Cl. ............................ 423/306; 502/214
[58] Field of Search .............. 502/214, 232, 263; 423/306

[56] References Cited

U.S. PATENT DOCUMENTS

| | | | |
|---|---|---|---|
| 3,081,154 | 3/1963 | Acker et al. | 502/232 |
| 4,440,871 | 4/1984 | Lok et al. | 502/214 |
| 4,465,657 | 8/1984 | Spijker | 502/232 |
| 4,481,174 | 11/1984 | Baacke et al. | 502/232 |
| 4,673,559 | 6/1987 | Derouane et al. | 423/306 |

FOREIGN PATENT DOCUMENTS 146384 6/1985 European Pat. Off.

Primary Examiner—Carl F. Dees
Attorney, Agent, or Firm—A. J. McKillop; M. G. Gilman; E. F. Kenehan, Jr.

[57] ABSTRACT

There is provided a process for preparation of crystalline microporous silicoaluminophosphates. The process involves the incorporation of a silicate complexing agent, such as fluoride, into an aqueous reaction mixture.

3 Claims, No Drawings

PREPARATION OF CRYSTALLINE SILICOALUMINOPHOSPHATES

CROSS-REFERENCE TO RELATED APPLICATIONS

This application is a continuation-in-part of copending U.S. application Ser. No. 816,090, filed Jan. 3, 1986 (and now abandoned), the entire disclosure of which is expressly incorporated herein by reference.

BACKGROUND

The present invention relates to the use of silicate complexing agents in the preparation of silicoaluminophosphates.

Crystalline, microporous silicoaluminophosphates are described in the Lok et al U.S. Pat. No. 4,440,871, the entire disclosure of which is expressly incorporated herein by reference.

SUMMARY

According to an aspect of the present invention, there is provided a process for preparing a microporous crystalline silicoaluminophosphate, the pores of which are uniform and have nominal diameters of greater than about 3 Angstroms, said process comprising forming an aqueous reaction mixture containing sufficient sources of $SiO_2$, $Al_2O_3$, $P_2O_5$ and an organic templating agent and crystallizing the reaction mixture thus formed at a temperature of at least 100° C. until crystals of silicoaluminophosphate are formed, wherein said reaction mixture further contains a silicate complexing agent in an amount sufficient to complex with silicate in the reaction mixture, whereby the release of silicate into the reaction mixture is controlled according to the mass action law.

EMBODIMENTS

In accordance with the present invention, the concentration of silicate ions is held at a low level by forming silicate complexes with fluoride or other complexing agents for silicate, e.g., catechol. The silicate complex releases silicate gradually according to the mass action law, as silicate is used up in the crystallization. The level of silicate available at any time during the crystallization can be adjusted to desired levels by varying the complexing agent concentration.

The silicoaluminophosphate produced in accordance with the process of the present invention may include at least 0.5 percent silicon atoms, at least 10 percent aluminum atoms and at least 10 percent phosphorus atoms, all percentages being expressed in terms of the total number of silicon, aluminum and phosphorus atoms.

Examples of suitable silicate complexing agents include sources of fluoride ions such as water soluble fluorides. These water soluble fluorides release sufficient amounts of fluoride ions into the aqueous reaction mixture to complex with silicate therein. Examples of such water soluble fluorides include ammonium fluoride and water soluble alkali metal fluorides such as sodium fluoride and potassium fluoride.

EXAMPLE 1

Solution 1: Aluminum chloride hexahydrate, 6.0 g, was dissolved in 20 g of water.

Solution 2: An 82.7 g quantity of tetramethylammonium hydroxide was mixed with 5.65 g of 86.3% phosphoric acid.

Solution 3: Ammonium fluoride, 1.0 g, was dissolved in 10 g of water.

Solution 3 was added to 5.1 g of silica sol (30% $SiO_2$). To this blend was added the mixture of solutions 1 and 2. The reaction mixture was then heated in a teflon-lined static pressure vessel at 160° C. After 8 days a crystalline material was obtained. The solid was filtered, washed with water and dried at ambient temperature.

$Si^{29}$ NMR confirmed that the silicon was located in the framework of the product. The chemical analysis gave the following mole ratios:

Si/Al = 1.09
P/Al = 0.59
C/N = 4.02
N/Al = 0.32

More particularly, the product had the following composition:

|  | wt. % |
| --- | --- |
| $SiO_2$ | 32.6 |
| $Al_2O_3$ | 25.4 |
| $P_2O_5$ | 20.7 |
| $Na_2O$ | 0.75 |
| N | 2.22 |
| C | 7.65 |
| F | 0.25 |
| Ash | 82.2 |

It gave the following X-ray diffraction pattern.

| d | $I/I_o$ | hkl |
| --- | --- | --- |
| 6.4392 | 24 | 110 |
| 4.5412 | 33 | 200 |
| 4.0552 | 4 | 210 |
| 3.7028 | 100 | 211 |
| 3.2065 | 11 | 220 |
| 2.8659 | 15 | 310 |
| 2.6171 | 20 | 222 |
| 2.4209 | 2 | 321 |
| 2.2647 | 5 | 400 |
| 2.1345 | 9 | 411,330 |
| 1.9292 | 7 | 332 |
| 1.8463 | 1 | 422 |
| 1.7754 | 16 | 431,510 |
| 1.6534 | 5 | 521 |
| 1.6006 | 6 | 440 |
| 1.5524 | 3 | 530,433 |

The lattice parameter of the cubic structure is about 9.055 Å, considerably larger than that of sodalite (8.870 Å), and that of high-silica TMA-sodalite (8.975 Å), and even larger than the largest lattice parameter calculated from the X-ray pattern of SAPO-20. The material is further distinguished from SAPO-20 by the presence of fluoride.

The X-ray diffraction pattern for SAPO-20 contains at least the lines set forth in Table 1.

TABLE 1

| 2 Theta | d Spacing (Å) | Relative Intensity |
| --- | --- | --- |
| 13.7–14.25 | 6.46–6.22 | M |
| 19.55–20.0 | 4.54–4.44 | W–M |
| 24.05–24.45 | 3.700–3.641 | VS |
| 34.35–35.0 | 2.611–2.564 | W |
| 42.5–43.0 | 2.127–2.103 | VW–W |

EXAMPLE 2

The reaction mixture was prepared in the same way as in Example 1, except that only 0.5 g NH₄F and 2.55 g of silica sol (30% SiO$_2$) were used. Crystallization was carried out at 180° C. The product had the following composition:

|  | wt. % |
|---|---|
| SiO$_2$ | 17.8 |
| Al$_2$O$_3$ | 28.7 |
| P$_2$O$_5$ | 29.3 |
| Na$_2$O | 0.23 |
| N | 2.45 |
| C | 6.55 |
| F | 0.73 |
| Ash | 81.66 |

The material had an X-ray diffraction pattern similar to that of Example 1. The unit cell parameter was about 9.00 A.

The subject matter of the present invention provides a method for preparation of silicoaluminophosphates that is believed to be more suitable for scale-up, in comparison with analogous processes, wherein silicate complexing agents are omitted.

What is claimed is:

1. A process for preparing a microporous crystalline silicoaluminophosphate, the pores of which are uniform and have nominal diameters of greater than about 3 Angstroms, said process comprising forming an aqueous reaction mixture containing sufficient sources of SiO$_2$, Al$_2$O$_3$, P$_2$O$_5$ and an organic templating agent and crystallizing the reaction mixture thus formed at a temperature of at least 100° C. until crystal of silicoaluminophosphate are formed, wherein said reaction mixture further contains a source of fluoride ions in an amount sufficient to complex with silicate in the reaction mixture, whereby the release of silicate into the reaction mixture is controlled according to the mass action law.

2. A process according to claim 1, wherein the total number of atoms of silicon, aluminum and phosphorus in said silicoaluminophosphate includes at least 0.5 percent silicon atoms, at least 10 percent aluminum atoms and at least 10 percent phosphorus atoms.

3. A process according to claim 1, wherein said silicoaluminophosphate has an X-ray powder diffraction pattern which contains at least the lines set forth in Table 1.

* * * * *